Dec. 7, 1965     S. TOLOTTA     3,222,627
ENCAPSULATED STRAIN GAGE ASSEMBLY
Filed May 21, 1964
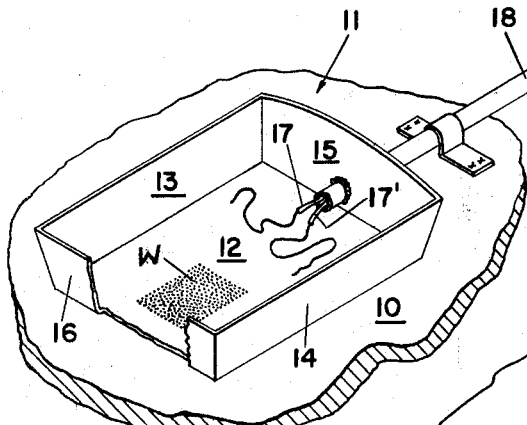
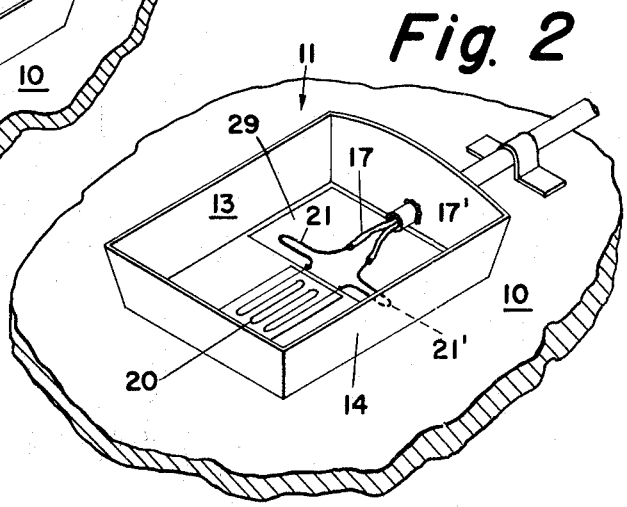
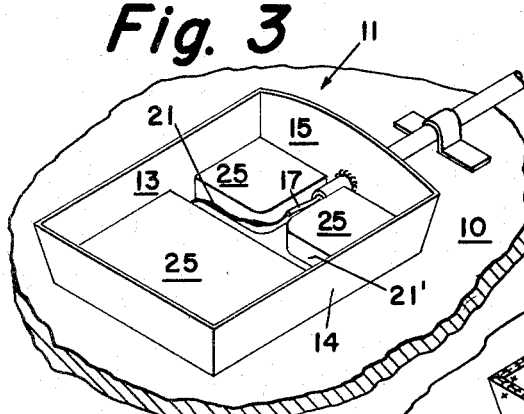
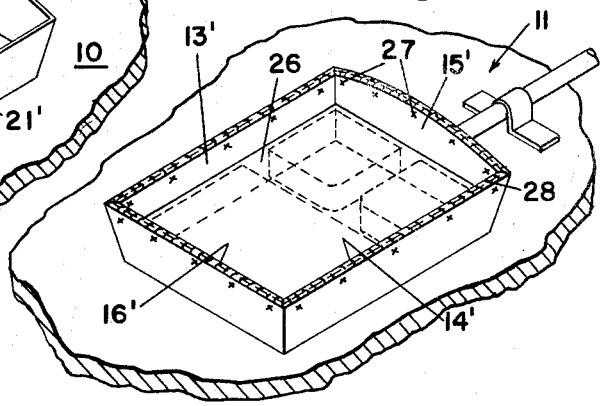
INVENTOR.
SAMUEL TOLOTTA
BY
*J. F. Sheehan*
ATTORNEY

United States Patent Office 3,222,627
Patented Dec. 7, 1965

3,222,627
ENCAPSULATED STRAIN GAGE ASSEMBLY
Samuel Tolotta, Yeadon, Pa., assignor to the United States of America as represented by the Secretary of the Navy
Filed May 21, 1964, Ser. No. 369,332
1 Claim. (Cl. 338—2)
(Granted under Title 35, U.S. Code (1952), sec. 266)

The invention described herein may be manufactured and used by or for the Government of the United States of America for governmental purposes without the payment of any royalties thereon or therefor.

This invention relates to foil strain gages and in particular is concerned with resistance wire or foil type gages for measuring strain under environmental conditions which normally have a deleterious effect on the gage filament or mountings therefor.

In using the above types of strain gages for testing materials which are subjected to high temperatures, such as steam environments, or on structures such as naval vessels, which are subjected to salt water environment for prolonged periods of time, problems are encountered, particularly in maintaining the gage in fixed position for making proper strain determinations. The prior art has resorted to various arrangements for using strain gages in such detrimental environments, for example, by mounting the filament type gages with waterproofing or sealing compounds. These, however, have not been entirely successful since it is difficult to permanently attach the assembly of gage and mounting compound to the test specimen since the attaching paste or cementitious material used will not withstand the steam or salt water conditions. Recent commercially available strain gage assemblies to overcome such environmental problems have resorted to utilizing metallic housings for the strain gage wires or filaments which permit the assembly to be secured to a specimen by welding. While these commercial assemblies overcome the problem of attaching the assembly to a specimen, they are not suitable for measuring strain in localized areas due to their relatively large size. Patent 3,105,139 to J. D. Russell shows a number of such strain gage assemblies and is mentioned since the present invention is directed to improvements over this disclosure.

Broadly, the invention provides an improved strain gage assembly which is attachable to the test specimen in such fashion that a strain-responsive coupling is attained over the entire effective length or area of the gage resistance filament located within a sealed metallic housing. In accordance with the invention, an open end metallic housing is first welded to the test specimen, for example, by normal tack welding techniques to provide a welded area which will be generally of the same outline or coterminous with the resistance filament which is then suitably adhered to the interior of the housing along the entire length and breadth of the weld area. The strain-responsive element or filament is preferably fixed to the housing directly over the zone of the weld area by a cementitious adherent material capable of withstanding high temperatures, and suitable conductor leads are connected to the filament and extend through a wall of the housing to a suitable read out device. The metallic housing is then suitably packed, provided with a cover and sealed. The gage housing will be formed of a weldable, freely-yielding or deformable material such, for example, as thin sheet steel stainless steel, platinum, aluminum, tungsten, etc. metal which is readily bonded to a metallic test specimen and the packing will be an insulation type of material.

The principal object of the invention is to provide a strain gage assembly of the resistance filament type which may be effectively used in environments that are detrimental to the functioning of the ordinary or commercial type strain gage units.

Another object of the invention is to provide a strain gage assembly of the resistance filament type which is particularly adapted for use in steam environments.

Another object of the invention is to provide a strain gage assembly of the resistance filament type which is operative to measure strain in areas of high stress concentration under steam environments.

A more specific object of the invention is to provide a strain gage assembly having its resistance filaments encapsulated or sealed in a metallic housing which is fixedly secured over a weld area to a test specimen.

For a better understanding of the invention, reference may be made to the accompanying drawings, FIGURE 1 is a view showing a portion of the housing of the strain gage assembly secured to a test specimen over a confined weld area.

FIGURE 2 is a view similar to FIGURE 1 but showing the filaments of the strain gage located generally over and coterminous with the weld area of FIGURE 1.

FIGURE 3 is a view of the structure of FIGURE 2 with insulation or packing medium incorporated in the housing.

FIGURE 4 is a view of the strain gage assembly of FIGURE 3 encapsulated by means of a sealed covering.

Referring to FIGURE 1, 10 represents the wall of an enclosure for containing steam such, for example, as a boiler which is to receive the strain gage assembly. At 11 is shown a portion of the housing which is in the form of an open end compartment having a base 12, opposed side walls 13–14 and opposed end walls 15–16 extending upwardly from the base 12. The base 12 is secured to the specimen wall 10 by a weld area W, which may be formed by a group of small closely spaced tack welds as shown or by a single large spot weld. The weld area W is of a predetermined size and shape to be substantially similar in size and shape to that of the strain gage filament wires. Sheathed electrical conductors 17–17' have inner ends located within the compartment as shown and extend outwardly through a tubular conduit 18 which passes through the end wall 15, in sealed relation for attachment to a suitable strain indicator, not shown.

In FIGURE 2, the strain gage unit consists of the wire filament 20 formed, for example, into a plurality of parallel and spaced strands and mounted on backing material which is disposed directly over and covers the weld area W of FIGURE 1. The filament 20, as shown, is connected to the conductors 17–17' by the conductor end portions 21–21'.

The strain gage unit will preferably be a commercial item of miniature size, for example, the gage filament 20 will extend over an area of the order of one-quarter inch in length by one-eighth inch in width to larger areas of upwardly of ½ inch in width in order to measure areas of high stress concentration. The gage filament will be bonded to the weld area with suitable commercial adhesive material capable of withstanding temperatures existing in steam environments.

In FIGURE 3, blocks or layers 25 of packing or insulation material are located in the compartment and, as shown, are suitably spaced about the conductor end portions 21–21' and disposed on the gage filament 20 to function in maintaining these elements in proper position.

The packing elements 25, although shown as only partially filling the compartment, are maintained in their proper positional relationship by means, as shown in FIGURE 4, of a closure having a top 26, upstanding opposed side walls 13', 14' and opposed end walls 15', 16' which mate the walls 12, 13, 14 and 15 and are respectively connected thereto by tack welds 27. The top 26 is of the general shape of the base 12 and a seal 28 preferably of silver solder is provided along the peripheries of the welded flange to, in effect, encapsulate the gage filament. Since the conductor end positions 21–21' are shown bare or unsheathed, a layer of insulation 29, shown in FIGURE 2, is located beneath the conductors during the assembling of the various elements as above described.

Obviously many modifications and variations of the present invention are possible in the light of the above teachings. It is therefore to be understood that, within the scope of the appended claim, the invention may be practiced otherwise than as specifically described.

I claim:

An assembly for measuring strain in metal equipment which comprises, (a) a base section of thin sheet metal having one face in contact with the equipment and secured thereto by a weld connection of confined area relative to the area of the base section, (b) a wire filament resistance secured to the other face of the base section and superimposed on the weld connection, (c) electrical conductor means connected to the ends of the wire filament resistance and extending away from the weld connection, (d) a cover section of thin sheet metal secured in tight fitting engagement with the base forming a sealed compartment therewith, (e) packing material in the compartment including a layer thereof which is superimposed on the wire filament resistance and (f) an aperture in a wall of the compartment for passage of the electrical conductor means in sealed relation therewith for connection to strain indicator means whereby the assembly effectively seals the wire filament resistance permitting measurements to be made on equipment used in high temperature steam environments.

References Cited by the Examiner

UNITED STATES PATENTS

| | | | |
|---|---|---|---|
| 2,935,709 | 5/1960 | Paine | 338—2 |
| 3,060,395 | 10/1962 | Sandven | 338—2 |
| 3,089,107 | 5/1963 | Dean | 338—2 |
| 3,105,139 | 9/1963 | Russell | 338—2 |

RICHARD M. WOOD, *Primary Examiner.*